United States Patent
Duchenay et al.

(10) Patent No.: US 9,007,929 B2
(45) Date of Patent: Apr. 14, 2015

(54) CORRELATING COMMUNICATION TRANSACTIONS ACROSS COMMUNICATION NETWORKS

(75) Inventors: William Duchenay, Cork (IE); Yohann A. Duchenay, Cork (IE); Paul B. French, Cork (IE); Paul F. Klein, Newbury Park, CA (US); Cathal O'Donovan, Waterfall (IE)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 12/982,566

(22) Filed: Dec. 30, 2010

(65) Prior Publication Data

US 2012/0170470 A1 Jul. 5, 2012

(51) Int. Cl.
*H04L 12/26* (2006.01)
*H04L 29/12* (2006.01)
*H04W 92/02* (2009.01)

(52) U.S. Cl.
CPC .............. *H04L 43/12* (2013.01); *H04L 43/106* (2013.01); *H04L 61/106* (2013.01); *H04L 61/6054* (2013.01); *H04L 61/2514* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 6,092,020 A * | 7/2000 | Fastenrath et al. | 701/119 |
| 6,108,700 A | 8/2000 | Maccabee et al. | |
| 2008/0196104 A1 * | 8/2008 | Tuvell et al. | 726/24 |
| 2009/0168995 A1 * | 7/2009 | Banga et al. | 380/28 |
| 2009/0327263 A1 * | 12/2009 | Maghoul | 707/5 |
| 2011/0191467 A1 * | 8/2011 | Imbimbo et al. | 709/224 |

FOREIGN PATENT DOCUMENTS

WO 2006016756 2/2006

* cited by examiner

*Primary Examiner* — Redentor Pasia
*Assistant Examiner* — Salvador E Rivas
(74) *Attorney, Agent, or Firm* — Sherman IP LLP; Kenneth L. Sherman; Steven Laut

(57) ABSTRACT

A system for correlating communication packets across different communication networks includes a first monitoring agent in a first network for collecting local identifying information of a communication packet at a communication node. The first monitoring agent pairs the local identifying information with a public identifying information of the packet for a second network. The first monitoring agent further adds a timestamp to the collected information. A second monitoring agent in the second network receives a communication packet from the communication node and collects public identifying information of the packet. The second monitoring agent adds a time-stamp to the collected information. A third monitoring agent in the second network receives the information collected by the first and the second monitoring agents and correlates packets based on the received information. The third monitoring agent determines when specific packets captured from the first network and the second network are related to each other.

20 Claims, 8 Drawing Sheets

CORRELATING COMMUNICATION TRANSACTIONS ACROSS COMMUNICATION NETWORKS

BACKGROUND OF THE INVENTION

1. Field of the Invention

The present invention relates generally to information correlation and in particular to transaction correlation across communication networks.

2. Background Information

Remote telecommunication companies that specialize in supporting infrastructures for wireless devices use proprietary wireless networks within their infrastructures that do not have direct network visibility to the Internet. Such proprietary networks rely on a routing device that functions as a gateway (or proxy) for transaction packets flowing between the proprietary networks and the Internet. A transaction packet originating from such a proprietary network is a private transaction packet that is converted into a public transaction packet as it flows through the routing device for entry into the Internet. As a result, conventionally such private and public transaction packets cannot be identified as related.

BRIEF SUMMARY OF THE INVENTION

Embodiments of the invention provide ability for monitoring and relating communication packets. In one embodiment the invention provides a system for correlating communication packets across different communication networks. The system comprises a first monitoring agent in a first communication network for collecting local identifying information of a communication packet at a communication node. The first monitoring agent pairs said local identifying information with a public identifying information of the communication packet for a second communication network, and further adds a timestamp to the collected information. The system further comprises a second monitoring agent in the second network for receiving a communication packet from the communication node and collecting public identifying information of the communication packet, wherein the second monitoring agent adds a time stamp to the collected information. The system further comprises a third monitoring agent in the second network for receiving the information collected by the first and the second monitoring agents, and correlating communication packets based on said received information, indicating when specific communication packets captured from the first network and the second network are related to each other.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1A:
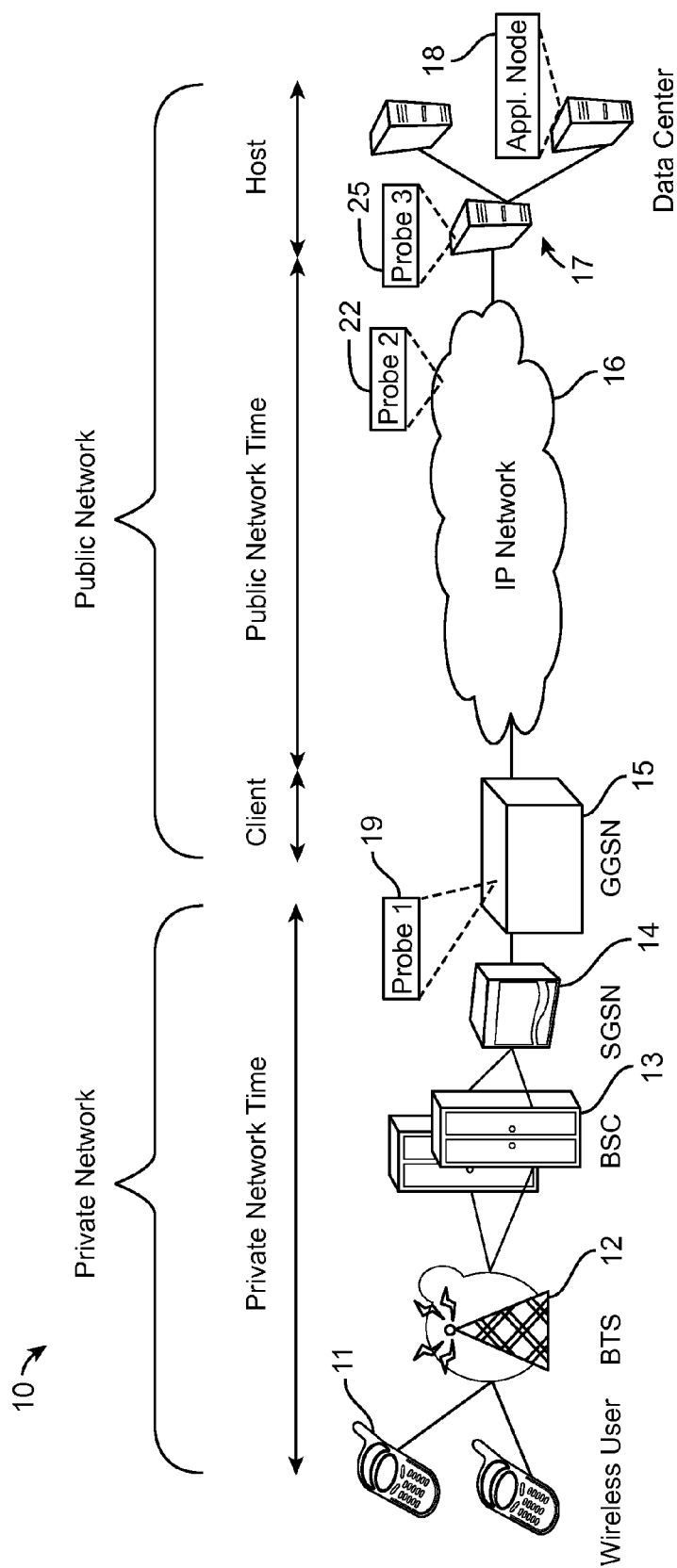
FIG. 1A illustrates a block diagram of a system that implements correlating communication transactions across communication networks, according to one embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for content presentation, as well as operation and/or component parts thereof. While the following description will be described in terms of content presentation systems and processes for clarity and placing the invention in context, it should be kept in mind that the teachings herein may have broad application to all types of systems, devices and applications.

A transaction packet originating from a proprietary network is a private transaction packet that is then converted into a public transaction packet as it flows through a routing device for entry into a public network. A conventional monitoring agent that monitors these packets as they flow between the private and public networks cannot correlate the private and public transaction packets and identify them as related. Embodiments of the invention provide correlating communication transactions (i.e., communication or transaction packets) across different communication networks such as a private communication network and a public communication network. Embodiments of the invention provide a process for relating transactions by detecting a matching transaction in the public network for a selected transaction in the private network.

In one embodiment of the invention, communications comprising transactions are created at a wireless device in a private network such as telecommunications environment, wherein typically the transactions are assigned a private network address. Employing a monitoring module (monitoring agent) at a telecommunications environment, and a monitoring agent in an enterprise environment, an analysis agent measures data gathered by the monitoring agents about transaction and correlates transactions flowing across the telecommunications environment and the enterprise environment, according to an embodiment of the invention.

A further embodiment of the invention utilizes such correlation for measuring the user experience in a transaction that originates from a device (e.g., a wireless or mobile device) in the telecommunications environment (e.g., wireless communication network) wherein the transaction traverses from the telecommunications network to the enterprise environment (e.g., an information technology data center). In one example, a user on a smart phone or personal digital assistant (PDA) generates a transaction by visiting a bank website to check his/her balance, or checks the latest stock quote on a company website.

As such, an embodiment of the invention provides correlating private network wireless transactions with public network transactions such that related transactions appear as one to a monitoring module, for the purpose of understanding end-to-end transaction performance. A method and system is provided for extracting the private network address (local address) and translated public network address of a transaction and matching that information with a transaction that has the same public network address. Because network addresses can quickly be reused, relating the two transactions may provide a false relationship if either of the network addresses are repeated (which occurs in commercial networks). Therefore, to ensure relating transactions with a high confidence of success (i.e., meaning that they are indeed related transactions), according to embodiments of the invention a process applies time synchronization between the two monitoring modules, then includes timestamps as part of the data collection of the two monitoring modules.

FIG. 1A shows a system block diagram for the architecture of a communication system 10 comprising a private communication network and a public communication network, implementing an embodiment of the invention. The communication system 10 further comprises a wireless device 11, a base transceiver station (BTS) 12, one or more base station controllers (BSCs) 13, a Serving GPRS Support Node (SGSN) 14, a Gateway GPRS Support Node (GGSN) 15, Internet 16, and a data center 17 (wherein GPRS stands for General Packet Radio Service). The system in FIG. 1A illustrates an example implementation of an embodiment of the invention in a GPRS communication system. Embodiments of the invention are useful with other communication systems such as, for example, Universal Mobile Telecommunications Service (UMTS) with different nodes performing similar functions (e.g., a BTS communicating with a NodeB, and a BSC communication with a Radio Network Controller (RNC)).

In one implementation illustrated in FIG. 1A, transaction response time monitors (probes) monitor a transaction. A first monitoring module/device 19 (Probe 1) in a mobile communication network such as private wireless network environment measures a first transaction time comprising a response time (traversal time period) of the transaction as the transaction flows from a wireless device 11 to the GGSN 15 and back. The transaction is typically identified by its International Mobile Subscriber Identity (IMSI) address as well as its private Transmission Control Protocol/Internet Protocol (TCP/IP) address. One embodiment of the invention comprises relating an IMSI and local TCP/IP of a private network wireless transaction to a UserID and TCP/IP address of a public network transaction, after the TCP/IP address of the private (local) transaction is translated by a GGSN routing device.

A second monitoring module/device 22 (Probe 2) in the public network, such as an Internet Protocol (IP) network, measures a second transaction time comprising a response time (traversal time period) of a transaction from the GGSN 15 to an Application Node 18 and back. The transaction is typically identified by its user identification USERID (login name) and public TCP/IP address. The GGSN 15 straddles both the public network and the private network.

A third monitoring module/device 25 (Probe 3) correlates transactions-based information from the first and second monitors 19, 22, indicating that specific transactions captured from the private network and the public network are in fact related to each other. For example, a transaction originating from the private network is properly identified as the same (related) transaction when in the public network.

In one application of an embodiment of the present invention, to measure the entire end-to-end time (from a wireless device 11 to an Application Node 18 and back) said first and second transaction time measurements (traversal times) are added together to determine an end-to-end response time. To add the time measurements together, a transaction in the private network is first correlated to a transaction in the public network, according to embodiments of the invention. For example, a transaction originating from the private network is properly identified as the same (related) transaction when in the public network, wherein the time measurement for the transaction in the private network can be added to the time measurement for that same packet in the public network.

Specifically, the Private Network Time in FIG. 1A indicates the response time as would be measured by Probe 1. The Public Network Time in FIG. 1A indicates the response time as would be measured by Probe 2. In the private network, transactions are known by IMSI and private network address. In the public network, transactions are known by USERID and public network address. For response time measurement at Probe 2, a time measurement is calculated using the transaction with USERID, as the time period for the transaction to traverse from GGSN 15 to the data center 17 (host) and back. For response time measurement at Probe 1, a time measurement is calculated using the transaction with IMSI as the time from wireless device 11 to the GGSN 15. Embodiments of the invention determine the relationship between the two transactions and the total end-to-end time.

As the transactions flow between the private network and the public network, the transactions eventually reach the GGSN 15, wherein the transactions are assigned a public network address for flowing over to the Internet. Thus, effectively two transactions are generated for a wireless transaction (request), one known inside the private network (including wireless domain) and one known in the public Internet Protocol (IP) network. Embodiments of the invention provide ability to correlate the transactions into a single relationship. Accordingly, both transactions are observed flowing by a monitor module and the transactions are related into a single relationship. Embodiments of the invention relate a transaction with an IMSI and private address to a transaction with a USERID and public network address.

As shown in FIG. 1A, embodiments of the invention provide measuring the overall performance of a private network such a mobile device communication network by correlating packets sent from the SGSN 14 to the GGSN 15 and packets sent from GGSN 15 to the IP network 16 based on a subscriber number and time of initiating a transaction. In one implementation, the invention provides correlating a transaction originating from the private network (such as a wireless network) with a transaction terminating at the public network (such as Internet). More specifically, embodiments of the invention provide a method and system for correlating IMSI and local TCP/IP address of a wireless transaction in the private network with a USERID and TCP/IP address after the TCP/IP address of the local transactions is translated by a GGSN routing device for flow into the private network.

Embodiments of the invention provide the ability to determine the entire end-to-end lifecycle of a wireless transaction for the purpose of understanding its performance. An embodiment of the invention utilizes three monitoring modules (e.g., Probe 1, Probe 2, Probe 3). In one implementation, one of the probes (Probe 3) is designed to receive data from the other two probes (Probe 1 and Probe 2) in a real-time sense. In another implementation, one of the probes (Probe 3) can read Probe 1 and Probe 2 databases in a more historical sense. A description of an implementation each of the probes, according to embodiments of the invention, is provided below.

Figure 1B:
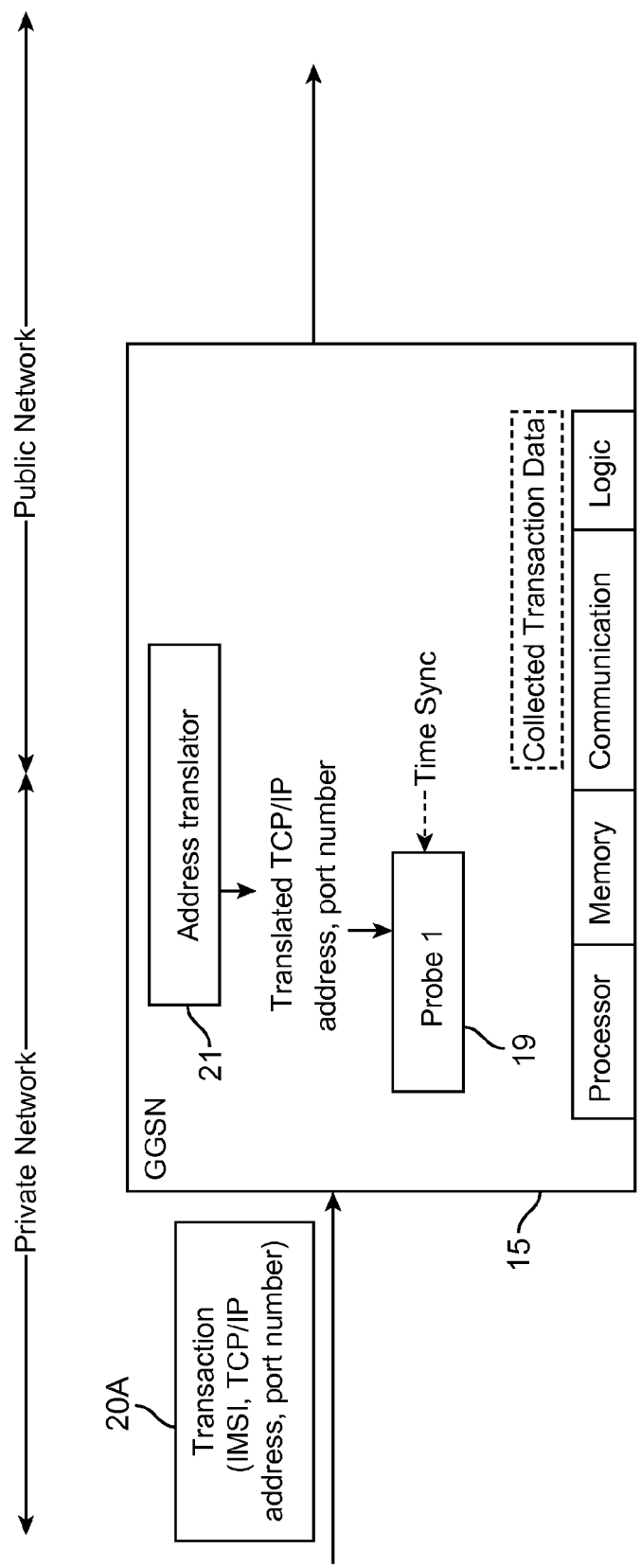
FIG. 1B illustrates a first monitoring module in the system of FIG. 1A, according to one embodiment of the invention.

Referring to FIG. 1B, according to an embodiment of the invention, a first probe (monitoring) module/device 19 designated as Probe 1 is implemented in the GGSN 15, on the private network side. In one embodiment, the GGSN 15 includes computing and communication hardware (e.g., processor, memory, communication module, storage, logic) for implementing various functions including the functions of Probe 1. As a wireless transaction 20A from a wireless device 11 (FIG. 1A) arrives inbound at the GGSN 15, the wireless transaction comprises a packet including an IMSI, the private TCP/IP Address and Port number assigned to the wireless device along with other data. Probe 1, using the logic in its code snippet, obtains the IMSI, TCP/IP address and Port number of the inbound transaction. An address translator module 21 in the GGSN 15 translates the private wireless address of the inbound transaction to a public TCP/IP Address and Port number, as part of an outbound transaction.

In one example implementation, the private network address comprises a private IP address or a TCP/IP address (and Port number) that is private to a network provider. Probe 1 takes a timestamp after pairing the translated information with the information collected from the inbound transaction and adds that timestamp to the information obtained (collected). In one embodiment, the pairing involves reuse of the information based on fields contained in the packets. The gathering of the private/public/timestamp by Probe 1, in conjunction with the public/timestamp data gathered by a Probe 2, is used by a Probe 3 to perform correlation as described further below, according to an embodiment of the invention. An example of the information collected by Probe 1 is as follows:

Probe 1 Data example:
IMSI (7D13F . . . 3D), Private Address (32.123.45.23: 1003), Public Address (74.110.33.15:3022), Timestamp (15:23:45.004 GMT)

Figure 1C:
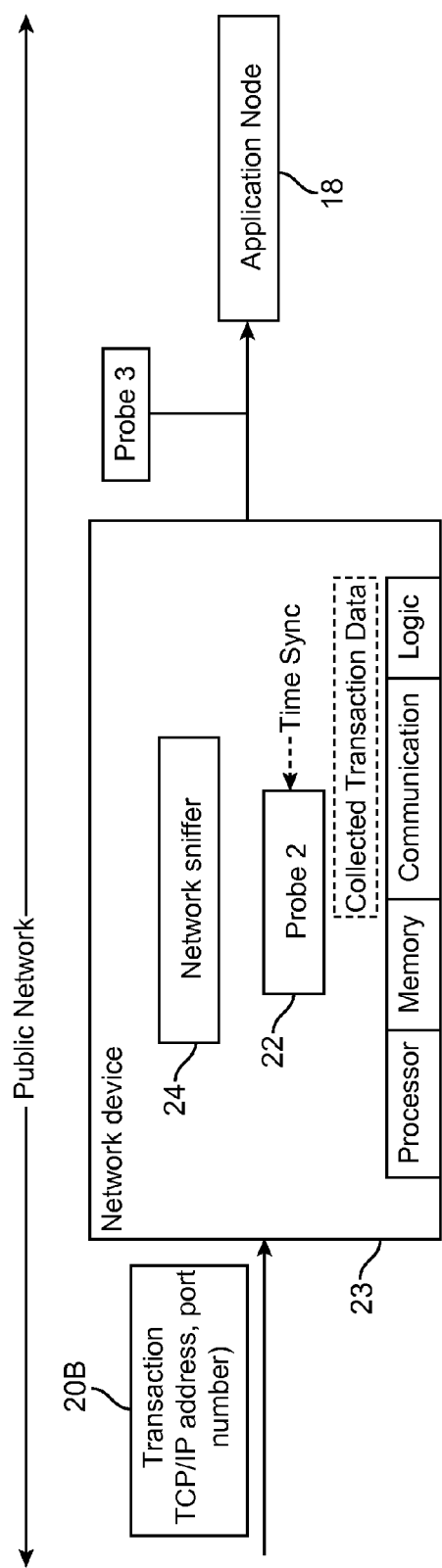
FIG. 1C illustrates a second monitoring module in the system of FIG. 1A, according to one embodiment of the invention.

Referring to FIG. 1C, according to an embodiment of the invention, a second probe (monitoring) module 22 designated as Probe 2 is implemented in the public network at a location in front of a first Application Node 18 to receive a GGSN-translated outbound transaction 20B from the GGSN 15 including the functions of Probe 2. In one embodiment, an Application Node 18 comprises an end point system in an IT infrastructure that hosts the services a user wants to utilize (e.g., a server supplying some service to the mobile user, such as a server for looking up a bank balance or an insurance policy, or a content server supplying video clips, news, ring tones, etc.). In one example, Probe 2 can be implemented in a network device 23 such as network switch device, router device, or software on a device that performs network sniffing.

In another example, Probe 2 can be implemented in a device at an exit point in a first Application Node 18 where control provides visibility to the TCP/IP network traffic. For encrypted networks, it would be beneficial to place Probe 2 in a first Application Node at an exit point that has visibility after the network traffic has been decrypted. Otherwise, for encrypted networks, Probe 2 may include a module to decrypt the network traffic itself using a standard service using an authorization certificate. Decryption is not mandatory for the invention disclosed herein, and only decrypted network traffic allows the benefit of ability to map the public transaction USERID to the IMSI (i.e., placing identity of an actual entity to the wireless device).

A program/code snippet of Probe 2 scans the network traffic as it passes over the public network using a network sniffer module 24 that implements standard network sniffing techniques known to those skilled in the art. In one example, network sniffing involves monitoring and viewing packet information sent on a network. A network sniffer is able to look at the flowing traffic on a network wire and see the information. Network sniffing software is often used by telecommunications service providers to perform analysis on network traffic (e.g., for optimization or network security purposes). Network sniffers capture data as it passes through the network and performs analysis on it. Often a network sniffer comprises a passive agent/probe that copies the data to another device so as not to affect the performance of the network itself. Initially, Probe 2 obtains the public TCP/IP address and Port number of the transaction 20B that is on its way to an Application Node 18. In addition, should the network data be decrypted, Probe 2 extracts the USERID and/or Session ID from the network payload data of the transaction 20B. Finally, Probe 2 attaches a timestamp to the obtained information.

USERID and Session ID are constructs of the particular protocol being used by the wireless device 11 (FIG. 1) and can be found in the network payload data of the transaction 20B. In one embodiment, for protocols such as HTTP and HTTPS (the most used by wireless devices), USERID and Session ID are located and extracted from the payload (for HTTP, Session ID is also called a Cookie) of the transaction 20B. An example of the information collected by Probe 2 is as follows:

Probe 2 Data example:
Public Address (74.110.33.15:3022), USERID (PKLEIN), SESSIONID (5D324 . . . 7D), Timestamp (15:23:45.016)

Figure 1D:
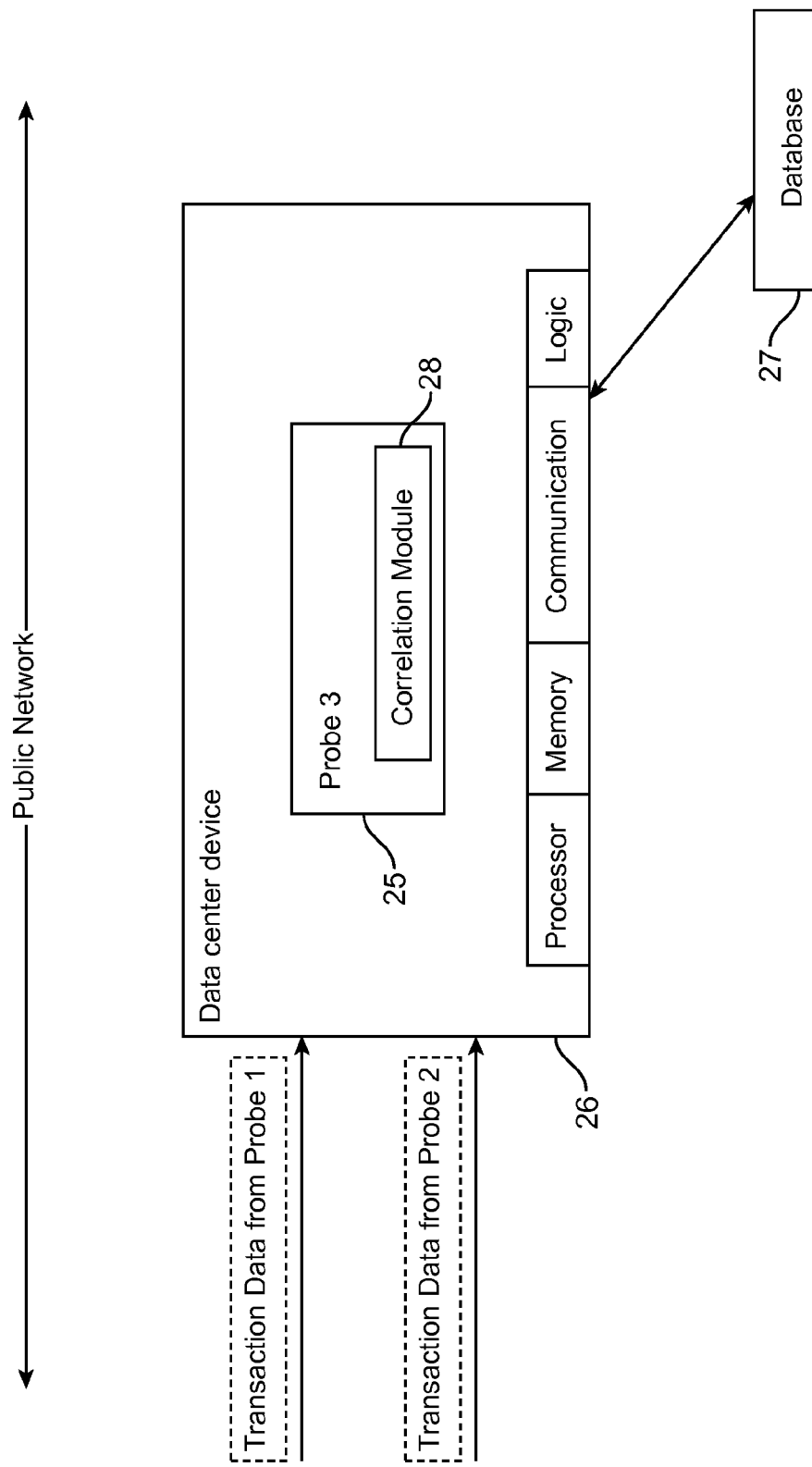
FIG. 1D illustrates a third monitoring module in the system of FIG. 1A, according to one embodiment of the invention.

Referring to FIG. 1D, according to an embodiment of the invention, a third probe (monitoring) module 25 designated as Probe 3 is implemented in the public network, such as in a data center computing device 26, wherein Probe 3 receives, over the network in real-time (or by database for historical), the collected data from both Probe 1 and Probe 2. In one embodiment, Probe 1 and Probe 2 create a network connection to Probe 3 then pass data over to Probe 3. Probes 1 and 2 can send this information via asynchronous events or messages (e.g., Simple Network Management Protocol (SNMP) used by Probe 3). Alternatively, Probe 3 may read this information from local stores on Probe 1 and Probe 2. Collected data obtained from Probes 1 and 2 is stored into a global database 27. Such collected data indicates specific transactions captured from the private network and public network, wherein a correlation module 28 of Probe 3 analyzes the transactions to determine whether they are in fact related to each other. An example of the information collected by Probe 3 is as follows:

Probe 3 Data Example:
IMSI (7D13F . . . 3D), Private Address (32.123.45.23: 1003), Public Address (74.110.33.15:3022), Timestamp (15:23:45.004 GMT), Public Address (74.110.33.15:3022), USERID (PKLEIN), SESSIONID (5D324 . . . 7D), Timestamp (15:23:45.016)

In one embodiment of the invention, for the purpose of transaction monitoring, any performance or tracking metrics (or any other metrics) captured in the private and public network, for related transactions, can be processed to obtain a total end-to-end response time result by Probe 3. In one example, Probe 1 in a private wireless network reports a transaction transversal time ("A") comprising a transaction transversal time between the wireless device and the GGSN (e.g., 1 second), and a transaction transversal time from GGSN back to wireless device (e.g., 2 seconds). Probe 2 in a public network reports a transaction transversal time ("B") comprising a transaction transversal time from GGSN to an Application Node (e.g., 3 seconds), and a transaction transversal time from the Application Node to the GGSN (e.g., 4 seconds). In one embodiment, the private network transversal time is added to the transversal times reported by the public network to obtain an end-to-end response time result, as follows:

Total End-to-End Response Time for Transaction IMSI (&D13F . . . 3D) USERID (PKLEIN):
  For IMSI (&D13F . . . 3D) USERID (PKLEIN) that occurred at Timestamp (15:23:45.016) the end-to-end response time is "A"+"B" (i.e., (1+2)+(3+4)=10 seconds) with 3 seconds transaction transversal time occurring in the private network and 7 seconds transaction transversal time occurring in the public network.

In one example, the end-to-end results are utilized to generate information about a user interaction and response time from the system. Response time is important to user satisfaction metrics. Such information may be used to determine acceptable levels of service or investment areas in the network to speed up response time, including root cause analysis (where bottlenecks are) and end-to-end performance of various service transactions. The end-to-end results may be used to determine how long a user who started the transaction has had to wait for results. Such information is useful in commercial applications because it allows a service provider to obtain a service quality metric to address user satisfaction issues in relation to network response time.

According to an embodiment of the invention, a process for relating transactions by detecting a matching transaction for a selected transaction further comprises time synchronization. According to an embodiment of the invention, a time synchronization process is provided to ensure that Probe 1 and Probe 2 utilize timestamps that are very close in synchronization (e.g., 5 seconds or less difference in the Probe 1 and Probe 2 timestamps for a transaction packet). The closer to zero the timestamp difference, the closer to 100% synchronization is obtained. In one implementation, the time synchronization process synchronizes timestamps to a global clock based on Greenwich Mean Time (GMT), for example using a protocol such as the Network Time Protocol (NTP) standard.

In one example, upon initialization Probe 1 contacts an Internet time service to compute a difference (delta) of its local time to that of GMT. Further, upon initialization Probe 2 contacts an Internet time service to compute a difference (delta) of its local time to that of GMT. In this way, timestamps delivered to Probe 3 are normalized to GMT. Time synchronizing takes into account the fact that transactions sent from the GGSN 15 to the Application Node 18, exhibit only normal network delays as opposed to long queue or application delays. As such, the network traffic flow from the private network arrives at the Application Node in the public network within a threshold time period denoted by n seconds or less. Therefore, timestamps from Probe 1 and Probe 2, for any given related transaction, show times relatively close to each other.

An example process for correlating transaction by the correlation module 28 of Probe 3 comprises correlation module 28 initially selecting a transaction (e.g., a first transaction) from data collected by Probe 1. The correlation module 28 then scans data collect by Probe 2 to detect a target transaction that has the same TCP/IP address and Port as the selected transaction. The correlation module 28 then compares the timestamps of the two transactions (i.e., the selected transaction and the detected transaction) by checking the difference between the stamps of the two transactions. If the timestamp difference is greater than n seconds, the correlation module 28 assumes that the two transactions are not related due to a reuse of the public TCP/IP address and Port at a later time.

If the timestamp difference is less than n seconds, the correlation module 28 assumes the detected transaction is a candidate match for the selected transaction. The correlation module 28 further scans data of Probe 2 to detect another transaction with the same public TCP/IP address and Port as the selected transaction. If no other transaction is detected, then the candidate transaction is a matching transaction with the selected transaction. If a second transaction is detected, the timestamps of the selected transaction and the second detected transaction are compared to determine if their difference is less than n seconds. If the timestamp difference for the second detected transaction and the selected transaction is less than n seconds, the second detected transaction becomes another candidate match for the selected transaction. When more than one candidate match transaction is detected, a confidence factor is applied. The confidence factor provides a statistical measure of confidence in the pairing when 100% certainty is not achieved. If only one candidate match is found, the confidence factor is 100%. When two candidate matches are found, the confidence factor is 50%. When three candidate matches are found, the confidence factor is 33%, and so on.

In one embodiment of the invention, the confidence factor can be further refined by utilizing the USERID and SESSION ID as part of the correlation module 28 comparison process once a transaction with the same public address is found. This would allow for finding a matching transaction with the same public address in less than n seconds as long as the USERID and/or SESSION ID were different than the selected transaction.

In one embodiment of the invention, the value of n is selected such that it provides the highest number of confidence factors of 100% with lesser confidence factors being small in comparison. An example of an initial value of the threshold time period n is about 10 seconds for commercial networks. Other values of n can be used (e.g., less than 15 seconds), and further fractions of a second can be utilized for a threshold time period.

When the final relating of the selected and a matching transaction is performed, the following is generated for a selected transaction IMSI (&D13F . . . 3D) USERID (PKLEIN):

Total End-to-End Response Time:
  For IMSI (&D13F . . . 3D) USERID(PKLEIN) that occurred at Timestamp (15:23:45.016) the end-to-end response time is "A"+"B" (i.e., (1+2)+(3+4)=10 seconds) with 3 seconds occurring in the private network and 7 seconds in the public network and the confidence factor that this is correct is 100%.

For multiple matching transactions wherein the confidence factor is less than 100%, the confidence factor means that there are two or more possible candidates. In that case, an average can be used or one candidate more suitable under the circumstances can be used.

Without close timestamp synchronization for Probe 1 and Probe 2, two occurrences of a public network address may be observed in transactions (e.g., one at time 15:23:45.016 and another at time 17:43:31.200). When Probe 3 attempts to match two detected transactions with a selected transaction, without a time reference Probe 3 is forced to randomly select between the two detected transactions as a match for the selected transaction (e.g., in this case a 50% confidence factor of being correct). It is not essential that the timestamps obtained from Probe 1 and Probe 2 be 100% in synchronization, only that they are relatively close such as less than 5 seconds difference (acceptable difference depends on the number of transactions flowing per second, wherein the fewer the transactions the larger the difference can be).

Figure 3:
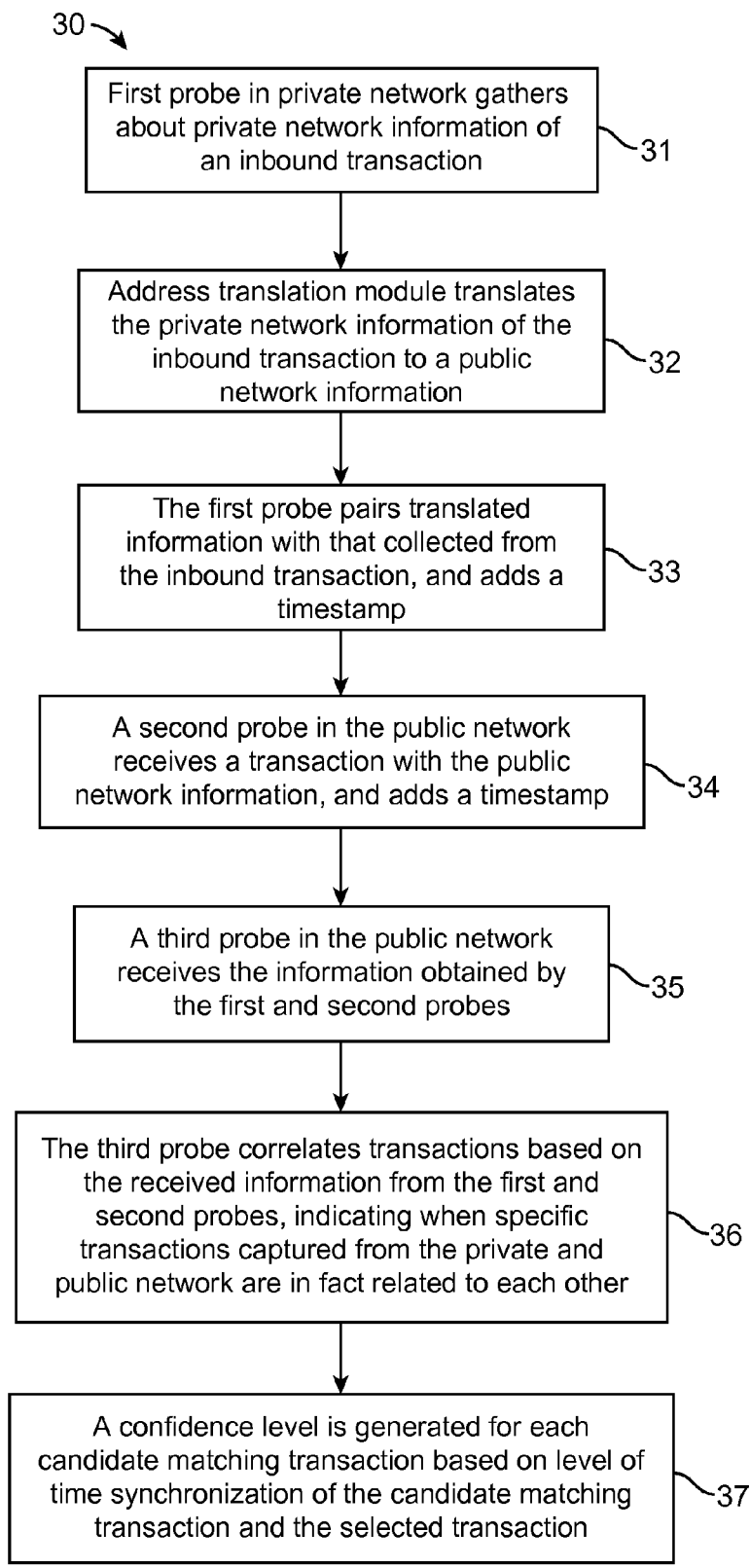
FIG. 3 illustrates a process for correlating communication transactions across communication networks, according to one embodiment of the invention.

FIG. 3 shows a flowchart of a process 30 according to an embodiment of the invention for correlating a selected transaction such as a packet of information having a private network address (e.g., IMSI), with a transaction having a public network address, comprising:

Block 31: A first probe module (e.g., Probe 1) in the private network gathers private network identifying information (local identifying information) of an inbound transaction (e.g., private network IMSI, TCP/IP address and Port number of the inbound transaction).

Block 32: An address translation module translates the private network identifying information of the inbound transaction to a public network identifying information (e.g., public network TCP/IP Address and Port number) as part of an outbound transaction.

Block 33: The first probe obtains the translated information (e.g., public network TCP/IP address and Port Number), and pairs it with the information (e.g., private network IMSI, TCP/IP address and Port number) collected from the inbound transaction, and adds a timestamp to the information obtained.

Block 34: A second probe module (e.g., Probe 2) in the public network receives a transaction with the public network information (i.e., said translated information), obtains the public network information (e.g., public network TCP/IP address and Port number) of the received transaction and adds a timestamp to the obtained information.

Block 35: A third probe module (e.g., Probe 3) in the public network receives the information obtained by the first and second probes.

Block 36: The third probe correlates transactions based on the received information from the first and second probes, indicating when specific transactions captured from the private and public network are in fact related to each other (i.e., a transaction originating from the private network is properly identified as the same (related) transaction when in the public network). Correlating transactions comprises detecting candidate matching transactions for a selected transaction, as discussed above.

Block 37: A confidence level is generated for each candidate matching transaction based on level of time synchronization of the candidate matching transaction and the selected transaction.

As such, embodiments of the invention provide monitoring and correlating (relating or reconciling) a transaction that begins at a wireless device, having a private network address, with that same transaction as it flows across the Internet having a public network address. Embodiments of the invention provide correlation of wireless and non-wireless information traversing network and application layers. One implementation utilizes transaction time synchronization, while another implementation utilizes insertion of information into the transaction IP header on the mobile side (private network) to aid transaction correlation on the IP side (public network).

Embodiments of the invention provide data correlation that reconciles two disjoint aspects of a network (mobile and internet) based on user name/IMSI/IP public and private addresses and time window. One embodiment comprises relating a International Mobile Subscriber Identity (IMSI) of a wireless transaction and local Transmission Control Protocol/Internet Protocol (TCP/IP) address of that wireless transaction, to a USERID of a public transaction and TCP/IP address, respectively, after TCP/IP address of the local transaction is translated by a GGSN routing device. Embodiments of the invention provide a process for reconciliation of a wireless USERID (IMSI) with service/application user identifiers (e.g., a login name for a WEB site). Embodiments of the invention provide a process for reconciliation of a subscriber identity and private IP address in the wireless side, with the USERIDs and public IP address on the Application Node side.

In one example application, the IP address on a mobile (wireless) device side is a private IP address and the IP address on the Internet side is a public address, having had Network Address Translation (NAT) performed on it at the GGSN/PDSN. The IMSI is not available on the public network side due to the de-tunneling of a mobile packet at the GGSN /PDSN and as such it is not possible to correlate transactions using IMSI at the public network side since IMSI is not available to the public network probe (i.e., Probe 2).

Embodiments of the invention provide correlating transactions across different networks such as an end-to-end transaction in a mobile data network in which the IMSI and (private) IP address on one side (mobile/wireless network) is not the same as the USERID and (public) IP address on the other side (IP network).

Figure 2:
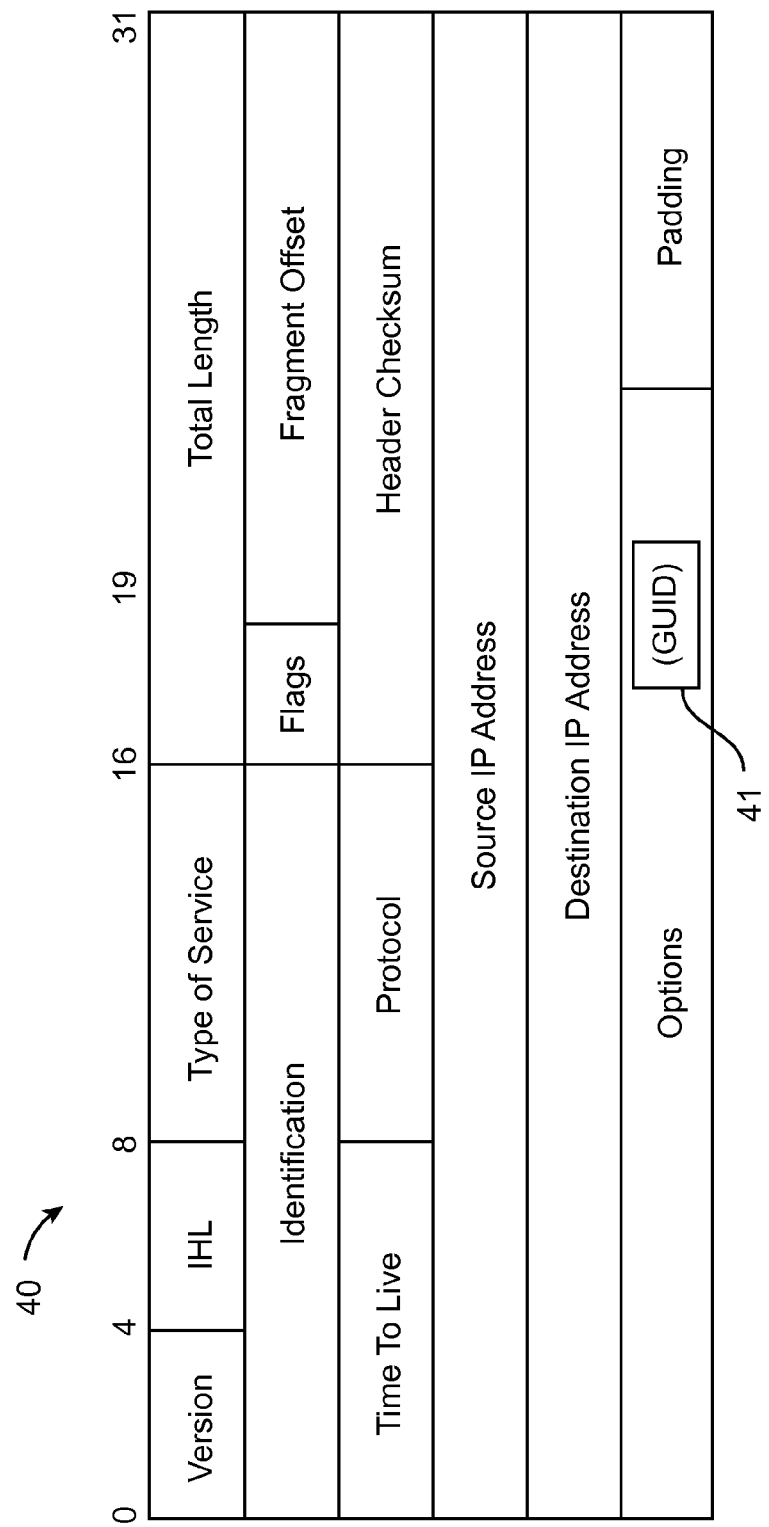
FIG. 2 illustrates a packet header including Global USE-RID for identifying a communication packet, according to one embodiment of the invention.

According to an embodiment of the invention, another process for relating transactions by detecting a matching transaction for a selected transaction further comprises modifying the "Options" field in a transaction TCP/IP header using a generated Global USERID (GUID) created by Probe 1. This process depends on the availability of the Options field in the TCP/IP header, but eliminates the need to compute a confidence factor because the confidence factor for a matching transaction would always be 100%. FIG. 2 shows a TCP/IP header 40 as modified with GUID data 41, according to an embodiment of the invention.

Figure 4:
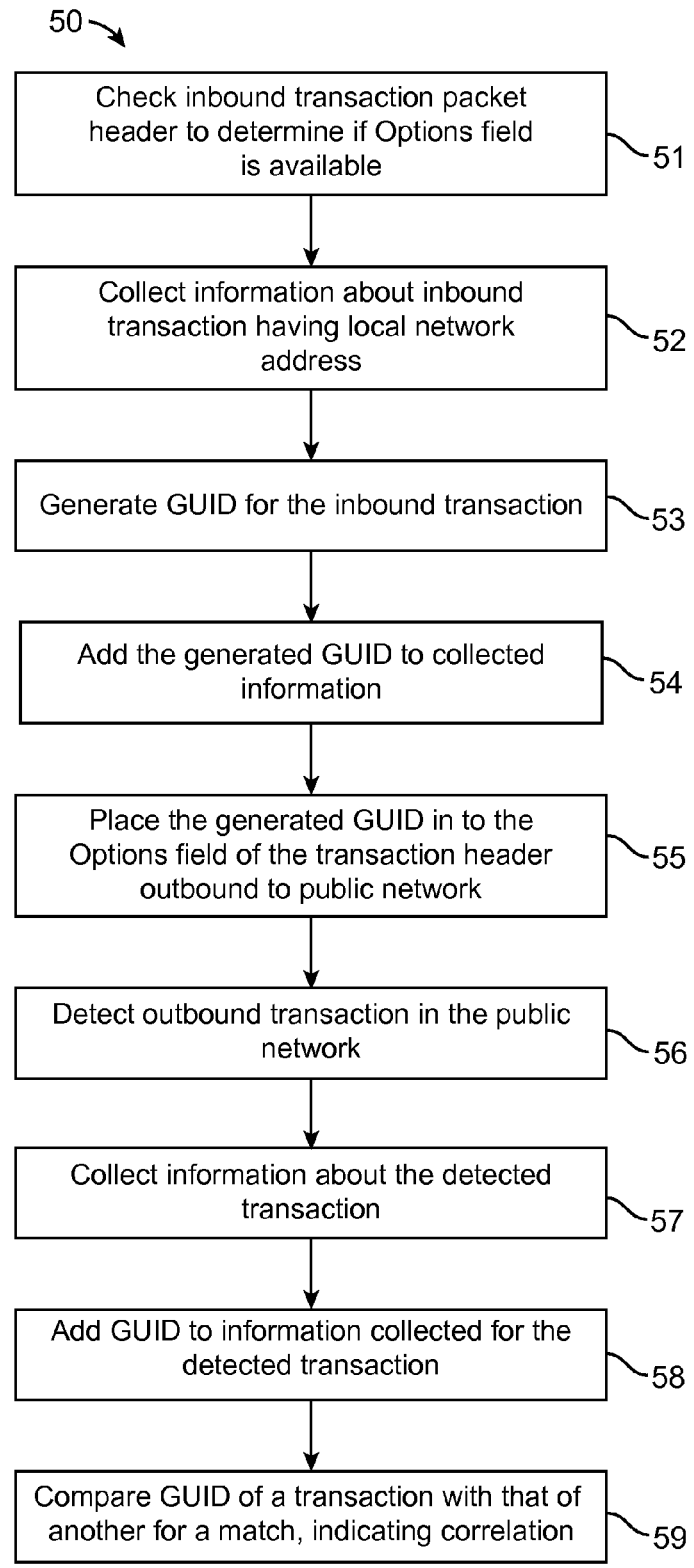
FIG. 4 illustrates a process for correlating communication transactions across communication networks, according to another embodiment of the invention.

FIG. 4 shows a flowchart of a process 50 including multiple process blocks for correlating a selected transaction having a private network address with a transaction having a public network address, according to an embodiment of the invention. When upon checking it is determined that the Options field is available, that is, it is not used by an application such as when it contain all zeros (block 51), Probe 1 after collecting information about the inbound transaction from the wireless device (block 52), generates a unique GUID of a fixed size (block 53). Generating a GUID of a fixed size is known to those skilled in the art. Probe 1 adds the generated GUID to the information collected about the inbound transaction (block 54) and places the GUID into the Options field of the transaction TCP/IP packet as it flows outbound from the GGSN 15 into the public network (block 55). An example of such Probe 1 data is as follows:

Probe 1 Data Example:
IMSI (7D13F . . . 3D), Private Address (32.123.45.23:1003), Public Address (74.110.33.15:3022), GUID (8E2D3278) Timestamp (15:23:45.004 GMT)

As the newly generated and translated TCP/IP transaction enters the public network, Probe 2 detects the transaction as it nears the Application Node 18 in the public network (block 56). Sniffing the network, Probe 2 is once again able to collect information about the detected transaction (block 57). In this case Probe 2 adds the GUID into the information collected on the detected transaction (block 58). An example of such Probe 2 data is as follows:

Probe 2 Data Example:
Public Address (74.110.33.15:3022), USERID (PKLEIN), SESSIONID (5D324 . . . 7D), GUID (8E2D3278) Timestamp (15:23:45.016)

Since the GUID, by definition, is unique throughout the lifecycle of time because it utilizes date and time as part of its generation, the process of relating transactions by Probe 3 (as seen by Probe 1 and Probe 2) comprises Probe 3 comparing the GUID of a selected transaction with that of another transaction to detect a match therebetween, indicating correlation (block 59).

As such, an embodiment of the invention provides correlation between private and public networks, by enhancing the information of the GGSN (public key, GUID). One implementation utilizes a public IP address mapped to an IMSI at a given time, or using a GUID. The GUID generation process may be based on the IMSI (date and time). Another embodiment of the invention provides correlation between private and public networks using time synchronization.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
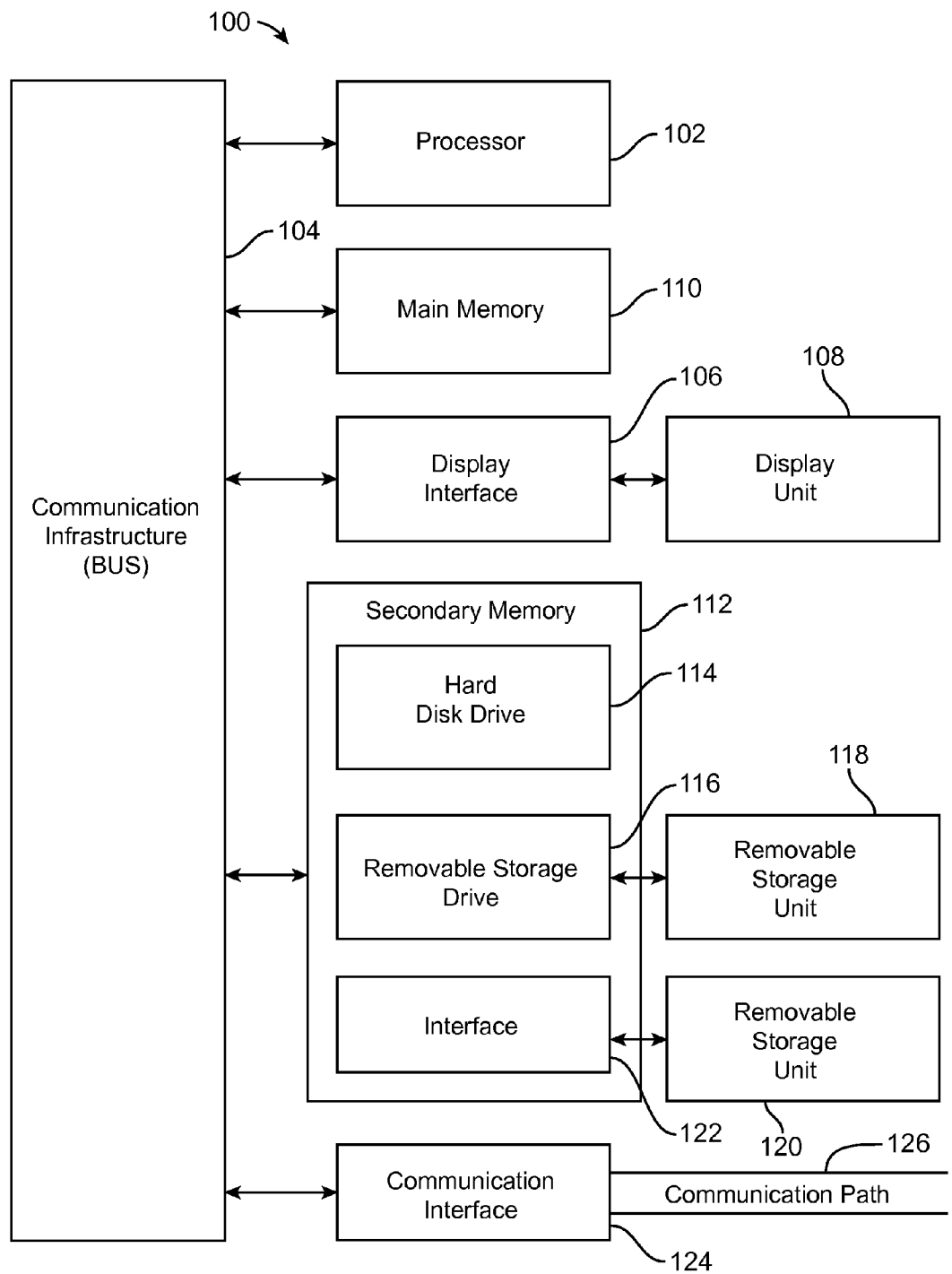
FIG. 5 illustrates a high level block diagram of an information processing system useful for implementing one embodiment of the invention.

FIG. 5 is a high level block diagram showing an information processing system 100 useful for implementing one embodiment of the present invention. The computer system 100 includes one or more processors, such as one or more processors 102. The processor(s) 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for correlating communication packets across different communication networks, comprising:
   a first monitoring agent in a first communication network that uses a processor in the first communication network to: collect local identifying information of a first communication packet of a communication node, pair said local identifying information with a public identifying information of the first communication packet for a second communication network, and add a first timestamp to the collected local identifying information;
   a second monitoring agent in the second network that uses a processor in the second communication network to: receive a second communication packet from the communication node, collect public identifying information of the second communication packet, and add a second timestamp to the collected public identifying information of the second communication packet; and
   a third monitoring agent in the second network that uses the processor in the second network to: receive the public identifying information collected by the first monitoring agent and the public identifying information of the second communication packet collected by the second monitoring agent, correlate communication packets based on said received public identifying information collected by the first monitoring agent and the public identifying information of the second communication packet collected by the second monitoring agent when specific communication packets captured from the first network and the second network are related to each other, wherein the first network comprises a private network and the second network comprises a public network, wherein the third monitoring agent comprises a correlation module that uses the processor to generate a confidence factor in the second network based on a threshold time period for identifying the same public identifying information contained in a selected communication packet and a target communication packet, wherein the same identifying information comprises a network address.

2. The system of claim 1, wherein:
   said first network comprises a mobile communication network;
   said second network comprises an IP network;

said communication packet in the first network comprises a transaction packet originating from the first network and terminating at the second network;

wherein network address translation occurs between the mobile network and the IP network;

wherein the transaction packet in the first network is converted into a public transaction packet for the second network.

3. The system of claim 2, wherein:

said local identifying information for a communication packet comprises an International Mobile Subscriber Identity (IMSI) and a local TCP/IP address of said communication packet in the mobile communication network; and said public identifying information for a communication packet comprises a USERID and a TCP/IP address in the IP network.

4. The system of claim 3, wherein:

said communication node comprises a Gateway GPRS Support Node (GGSN) routing device including a translator that translates said local identifying information of the communication packet into said public identifying information for said second communication network; and the third monitoring agent uses the processor in the second network to correlate said IMSI and local TCP/IP address of a communication packet in the mobile communication network, with USERID and TCP/IP address of a communication packet in the IP network, after the local network TCP/IP address is translated to the IP network TCP/IP address by the translator.

5. The system of claim 4, wherein:

the first monitoring agent uses the processor in the first network to perform a time synchronization with a global clock at initialization; and the second monitoring agent uses the processor in the second network to perform a time synchronization with the global clock at initialization;

such that the first and second monitoring agents are in close time synchronization.

6. The system of claim 5, wherein:

the third monitoring agent comprises a correlation module that uses the processor in the second network to correlate communication packets based on the received local and public identifying information and further based on said timestamps, indicating when specific communication packets captured from the first network and the second network are related to each other.

7. The system of claim 6, wherein:

the identifying information comprises one or more of user identification information and session identification information, and the confidence factor is based on a comparison of the threshold time period and the timestamps of the selected communication packet and the target communication packet.

8. The system of claim 1, wherein:

the first monitoring agent uses the processor in the first network to provide a unique global user identification (GUID) in an options field of a packet header of the communication packet in the first communication; and the third monitoring agent uses the processor in the second network to correlate communication packets based on the GUID, indicating when specific communication packets captured from the first network and the second network are related to each other.

9. A method for correlating communication packets across different communication networks, comprising:

in a first communication network, collecting local identifying information of a communication packet at a communication node, pairing said local identifying information with a public identifying information of the communication packet for a second communication network, and adding a first timestamp to the collected local identifying information;

in the second network, receiving a communication packet from the communication node, collecting public identifying information of the communication packet, adding a second timestamp to the collected public identifying information; and performing correlation by receiving the collected local and public identifying information, correlating communication packets based on said received information when specific communication packets captured from the first network and the second network are related to each other, and generating a confidence factor based on a threshold time period for identifying the same public identifying information contained in a selected communication packet and a target communication packet wherein the same identifying information comprises a network address.

10. The method of claim 9, wherein:

said first network comprises a mobile communication network;

said second network comprises an IP network; and said communication packet in the first network comprises a transaction packet originating from the first network and terminating at the second network;

wherein network address translation occurs between the mobile network and the IP network;

wherein the transaction packet in the first network is converted into a public transaction packet for the second network.

11. The method of claim 10, wherein:

said local identifying information for a communication packet comprises an International Mobile Subscriber Identity (IMSI) and a local TCP/IP address of said communication packet in the mobile communication network; and said public identifying information for a communication packet comprises a USERID and a TCP/IP address in the IP network.

12. The method of claim 11, wherein:

said communication node comprises a Gateway GPRS Support Node (GGSN) routing device including a translator that translates said local identifying information of the communication packet into said public identifying information for said second communication network; and performing correlation further comprises correlating said IMSI and local TCP/IP address of a communication packet in the mobile communication network, with USERID and TCP/IP address of a communication packet in the IP network, after the local network TCP/IP address is translated to the IP network TCP/IP address by the translator.

13. The method of claim 12, further comprising:

performing time synchronization by:

in the first network, performing a time synchronization with a global clock for adding said first timestamp; and in the second network, performing a time synchronization with the global clock for adding said second timestamp.

14. The method of claim 9, wherein:
performing correlation further comprises correlating communication packets based on the received local and public identifying information and further based on said first and second timestamps, indicating when specific communication packets captured from the first network and the second network are related to each other.

15. The method of claim 14, wherein: the same identifying information comprises one or more of user identification information and session identification information, and the confidence factor is based on a comparison of the threshold time period and selected communication packet and the target communication packet.

16. The method of claim 9, further comprising:
in the first communication network, providing a unique global user identification (GUID) in an options field of a packet header of the communication packet; and
correlating communication packets based on the GUID, indicating when specific communication packets captured from the first network and the second network are related to each other.

17. A computer program product for correlating communication packets across different communication networks, comprising:
a non-transitory computer usable medium having computer readable program code embodied therewith, wherein the computer readable program code when executed on a computer causes the computer to perform operations comprising:
in a first communication network, collecting local identifying information of a communication packet at a communication node, pairing said local identifying information with a public identifying information of the communication packet for a second communication network, and adding a first timestamp to the collected local identifying information;
in the second network, receiving a communication packet from the communication node, collecting public identifying information of the communication packet, adding a second timestamp to the collected public identifying information; and
performing correlation by receiving the collected local and public identifying information, correlating communication packets based on said received information when specific communication packets captured from the first network and the second network are related to each other, and
generating a confidence factor based on a threshold time period for identifying the same public identifying information contained in a selected communication packet and a target communication packet, wherein the same identifying information comprises a network address,
wherein the first network comprises a private network and the second network comprises a public network.

18. The computer program product of claim 17, wherein the program code further causes the computer to perform operations further comprising:
performing time synchronization by:
in the first network, performing a time synchronization with a global clock for adding said first timestamp; and
in the second network, performing a time synchronization with the global clock for adding said second timestamp;
wherein the communication packet originating in the first network comprises a transaction packet, and the transaction packet in the first network is converted into a public transaction packet for the second network.

19. The computer program product of claim 18, wherein the program code further causes the computer to perform operations further comprising:
correlating communication packets based on the received local and public identifying information and further based on said first and second timestamps, indicating when specific communication packets captured from the first network and the second network are related to each other;
wherein the same identifying information comprises one or more of user identification information and session identification information, and the confidence factor is based on a comparison of the threshold time period and-the timestamps of the selected communication packet and the target communication packet.

20. The computer program product of claim 17, wherein the program code further causes the computer to perform operations further comprising:
in the first communication network, providing a unique global user identification (GUID) in an options field of a packet header of the communication packet; and
correlating communication packets based on the GUID, indicating when specific communication packets captured from the first network and the second network are related to each other.

\* \* \* \* \*